United States Patent
Chang et al.

(10) Patent No.: US 9,509,986 B2
(45) Date of Patent: Nov. 29, 2016

(54) ELECTRONIC DEVICE AND METHOD FOR CALIBRATING SPECTRAL CONFOCAL SENSORS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Li Jiang, Shenzhen (CN); Xiao-Guang Xue, Shenzhen (CN); Na Yu, Shenzhen (CN); Zhi-Jun Zou, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 621 days.

(21) Appl. No.: 14/060,722

(22) Filed: Oct. 23, 2013

(65) Prior Publication Data
US 2014/0139638 A1    May 22, 2014

(30) Foreign Application Priority Data
Nov. 20, 2012    (CN) .................. 2012 1 0471161X

(51) Int. Cl.
G06K 9/00    (2006.01)
H04N 17/00    (2006.01)

(52) U.S. Cl.
CPC .................. H04N 17/002 (2013.01)

(58) Field of Classification Search
None
See application file for complete search history.

(56) References Cited

U.S. PATENT DOCUMENTS

| | | | |
|---|---|---|---|
| 7,227,618 B1 * | 6/2007 | Bi ................. | G03F 7/70275 355/67 |
| 7,747,101 B2 * | 6/2010 | Matsuzawa ........ | G01M 11/0264 356/124 |
| 8,184,301 B2 * | 5/2012 | Benz .................. | G01B 11/255 356/614 |
| 2006/0158612 A1 * | 7/2006 | Polland ............... | A61B 3/107 351/206 |
| 2014/0043610 A1 * | 2/2014 | Engel .................. | G01B 11/14 356/369 |
| 2014/0071263 A1 * | 3/2014 | Laguarta Bertran ............ | G02B 21/0016 348/79 |

* cited by examiner

Primary Examiner — Soo Park
(74) Attorney, Agent, or Firm — Zhigang Ma

(57) ABSTRACT

A measurement machine includes an optical lens and a spectral confocal sensor. An electronic device adjusts a zoom ratio of the lens to be a maximum ratio, and calculates X, Y, Z coordinate differences between the lens center and the sensor center. The electronic device calibrates the X, Y coordinate differences at least twice, to obtain calibrated X, Y coordinate differences. The X, Y differences are replaced by the calibrated X, Y coordinate differences when the calibrated X, Y coordinate differences satisfy first predetermined requirements. The electronic device further calibrates the Z coordinate difference at least twice to obtain a calibrated Z coordinate difference. The Z coordinate difference is replaced by the calibrated Z coordinate difference when the calibrated Z coordinate difference satisfies second predetermined requirements.

12 Claims, 4 Drawing Sheets

ELECTRONIC DEVICE AND METHOD FOR CALIBRATING SPECTRAL CONFOCAL SENSORS

BACKGROUND

1. Technical Field

Embodiments of the present disclosure relate to three-dimensional (3D) measurement technology, and more particularly to an electronic device and a method for calibrating spectral confocal sensors of image measurement machines.

2. Description of Related Art

In 3D image measurements, image measurement machines are widely used to measure products. However, due to limits of measurement precision of the image measurement machines, measurement results may be not accurate. Therefore, there is room for improvement.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
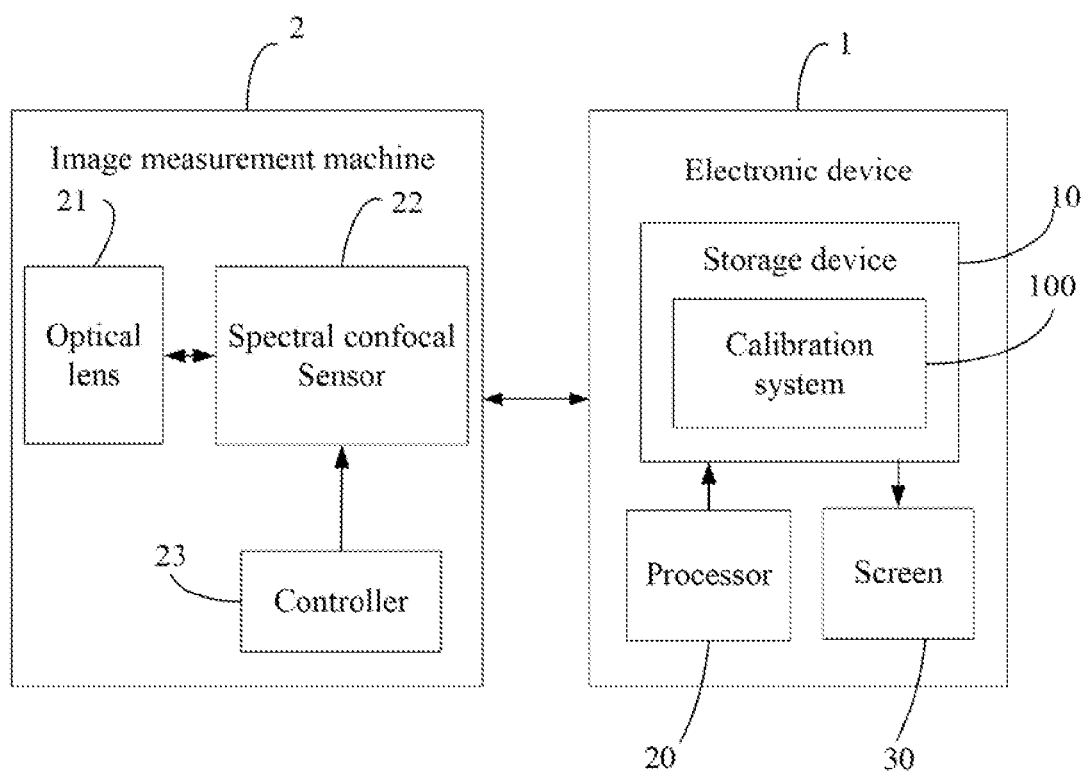
FIG. 1 is a block diagram of one embodiment of an electronic device including a calibration system

FIG. 1 is a block diagram of one embodiment of an electronic device 1 including a calibration system 100. The electronic device 1 further includes a processor 20 and a screen 30, and may further include other components that are not shown in FIG. 1. The electronic device 1 is electronically connected to an image measurement machine 2. The image measurement machine 2 includes an optical lens 21, a spectral confocal sensor 22, and a controller 23, and may further include other components that are not shown in FIG. 1. The controller 23 is electronically connected to the spectral confocal sensor 22. The calibration system 100 is used to calibrate the spectral confocal sensor 22.

In one embodiment, during an image measurement process, the spectral confocal sensor 22 is parallel with the optical lens 21. The optical lens 21 may be a charge coupled device (CCD), for example. The controller 23 stores compensation data of all types of spectral confocal sensor, and compensation data of the spectral confocal sensor 22 should be selected from the controller 23 before using the spectral confocal sensor 22 for image measurement.

The calibration system 100 includes computerized code, which is in the form of one or more modules (please refer to FIG. 2) and stored in the storage device 10. The storage device 10 may be a dedicated memory, such as an EPROM, a hard disk drive (HDD), or a flash memory. In some embodiments, the storage system 10 may also be an external storage device, such as an external hard disk, a storage card, or other data storage medium. The processor 20 executes the computerized code of the calibration system 100, to control operations of the optical lens 21, and perform calibration operations on the spectral confocal sensor 22.

The screen 30 displays an operation interface for users to select or set parameters of the spectral confocal sensor 22 and parameters of the optical lens 21. The parameters of the spectral confocal sensor 2 may include, but not limited to, the type, the compensation data, a sampling frequency, and an illumination intensity of the spectral confocal sensor 22. The parameters of the optical lens 21 may include, but not be limited to, a zoom ratio of the optical lens 21.

Figure 2:
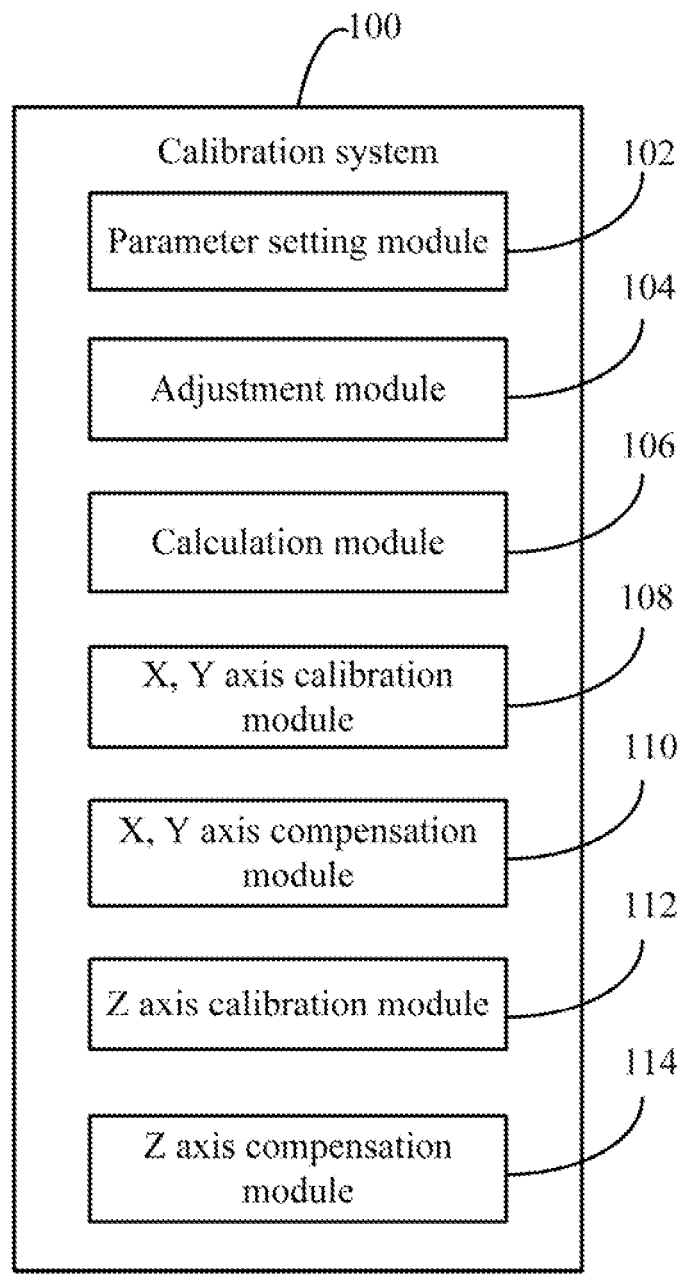
FIG. 2 is a block diagram of one embodiment of function modules of the calibration system as shown in FIG. 1.

As shown in FIG. 2, the calibration system 100 includes a parameter setting module 102, an adjustment module 104, a calculation module 106, an X, Y axis calibration module 108, an X, Y compensation module 110, a Z axis calibration module 112, and a Z axis compensation module 114. Detailed description of the modules 102-114 is given below and with reference to FIG. 3.

Figure 3:
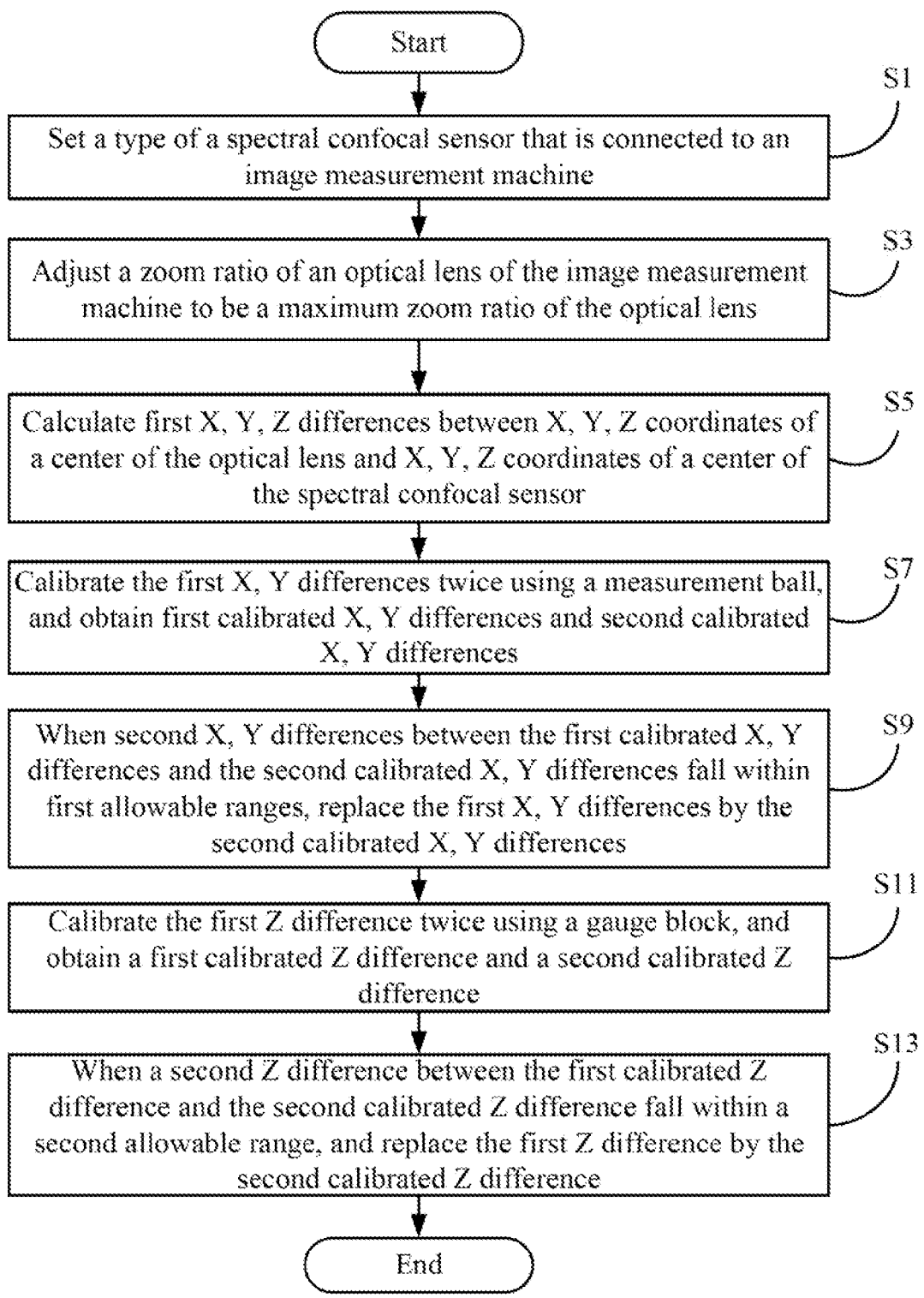
FIG. 3 is a flowchart of one embodiment of a method for calibrating a spectral confocal sensor.

FIG. 3 is a flowchart of one embodiment of a method for calibrating the spectral confocal sensor 22. Depending on the embodiment, additional steps may be added, others removed, and the ordering of the steps may be changed.

In step S1, the parameter setting module 101 receives a type of the spectral confocal sensor 22 set by a user, and retrieves compensation data of the spectral confocal sensor 22 from the controller 23 according to the type. The compensation data of the spectral confocal sensor 22 is used to compensate data (such as coordinate data) measured by the spectral confocal sensor 22, to improve a measurement precision of the spectral confocal sensor 22. The parameter setting module 101 may further receive a sampling frequency and an illumination intensity of the spectral confocal sensor 22 set by the user. It is noted that step S1 is optional on condition that the aforementioned parameters related to the spectral confocal sensor 22 have been set before starting the calibration process.

In step S3, the adjustment module 104 adjusts a zoom ratio of the optical lens 21 of the image measurement machine 2 to be a maximum zoom ratio (such 3×) of the optical lens 21. For example, the zoom ratio of the optical lens may have an initial value "1×". When the user sets the zoom ratio to be "3×," the adjustment module 104 automatically adjusts the zoom ratio of the optical lens 21 from "1×" to "3×."

In step S5, the calculation module 106 calculates first X, Y, Z differences between X, Y, Z coordinates of a center of the optical lens 21 and X, Y, Z coordinates of a center of the spectral confocal sensor 22, and stores the first X, Y, Z differences in the storage device 20.

In step S7, the X, Y axis calibration module 108 calibrates the first X, Y differences at least twice using a measurement ball, to obtain first calibrated X, Y differences and second calibrated X, Y differences. A detailed description regarding a calibration process of the first X, Y differences using the measurement ball is given in FIG. 4.

In step S9, the X, Y compensation module 110 calculates second X, Y differences between the first calibrated X, Y differences and the second calibrated X, Y differences, and determines if the second X, Y differences fall within first allowable ranges. When the second X, Y differences fall within the first allowable ranges, the X, Y compensation module 110 replaces the first X, Y differences by the second calibrated X, Y differences. For example, the first allowable ranges include a X difference allowable range [x1, x2] and a Y difference allowable range [y1, y2]. If a second X difference between the first calibrated X difference and the second calibrated X difference falls within the X difference allowable range [x1, x2], and a second Y difference between the first calibrated Y difference and the second calibrated Y difference falls within the Y difference allowable range [y1, y2], the X, Y compensation module 110 replaces the first X difference by the second calibrated X difference, and replaces the first Y difference by the second calibrated Y difference.

In step S9, if the X, Y compensation module 110 determines that the second X, Y differences between the first calibrated X, Y differences and the second calibrated X, Y differences do not fall within the first allowable ranges, the X, Y compensation module 110 activates the X, Y axis calibration module 108 to calibrate the first X, Y differences twice again (i.e., step S7 is implemented again). For example, if the second X difference between the first calibrated X difference and the second calibrated X difference falls outside the X difference allowable range [x1, x2], the X, Y compensation module 110 is activated to calibrate the first X, Y differences twice again, and obtains new first calibrated X, Y differences and new second calibrated X, Y differences, until the X, Y compensation module 110 determines that differences between the new first calibrated X, Y differences and the new second calibrated X, Y differences fall within the first allowable ranges. Then, the X, Y compensation module 110 replaces the first X difference by the new second calibrated X difference, and replaces the first Y difference by the new second calibrated Y difference.

In step S11, the Z axis calibration module 112 calibrates the first Z difference at least twice using a gauge block, to obtain a first calibrated Z difference and a second calibrated Z difference. The gauge block is a metal or ceramic block used as a reference for the calibration. In one embodiment, the gauge block is placed on a worktable of the image measurement machine, the optical lens 21 and the spectral confocal sensor 22 respectively measures coordinates of a same point on the gauge block, and Z coordinate differences between the Z coordinates measured by the optical lens 21 and the Z coordinates measured by the spectral confocal sensor 22 are used to calibrate the first Z difference. It is noted that using the gauge block as the reference for calibration, the zoom ratio of the optical lens 21 should be adjusted to the maximum zoom ratio.

In step S13, the Z axis compensation module 114 calculates a second Z difference between the first calibrated Z difference and the second calibrated Z difference, and determines if the second Z difference falls within a second allowable range. When the second Z difference falls within the second allowable range, the Z axis compensation module 114 replaces the first Z difference by the second calibrated Z difference.

If the Z axis compensation module 114 determines that the second Z difference between the first calibrated Z difference and the second calibrated Z difference does not fall within the second allowable range, the Z axis compensation module 114 activates the Z axis calibration module 112 to calibrate the first Z difference twice again (i.e., step S11 is implemented again). For example, if the second Z difference between the first calibrated Z difference and the second calibrated Z difference falls outside the second difference allowable range (such as [z1, z2]), the Z calibration module 112 is activated to calibrate the first Z difference twice again, and obtains a new first calibrated Z difference and a new second calibrated Z difference, until the Z compensation module 114 determines that difference between the new first calibrated Z difference and the new second calibrated Z difference fall within the second allowable range. Then, the Z compensation module 114 replaces the first Z difference by the new second calibrated Z difference.

Figure 4:
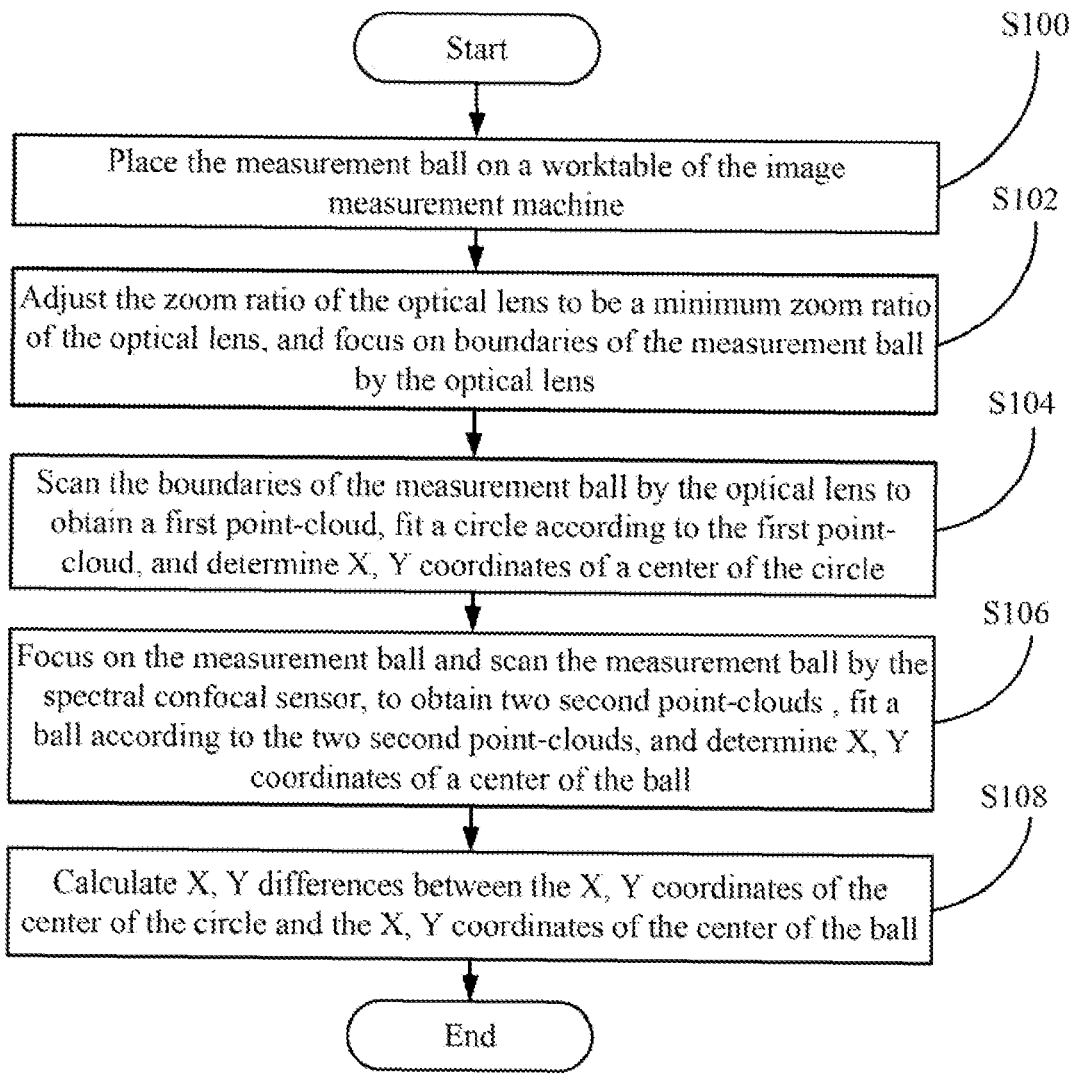
FIG. 4 details one step in FIG. 3.

FIG. 4 details the calibration process of the first X, Y differences using the measurement ball mentioned in step S7. Depending on the embodiment, additional steps may be added, others removed, and the ordering of the steps may be changed.

In step S100, the measurement ball is placed on the worktable of the image measurement machine 2. The measurement ball is regarded as a reference for the calibration.

In step S102, the adjustment module 104 adjusts the zoom ratio of the optical lens 21 to be a minimum zoom ratio of the optical lens 21, and controls the optical lens 21 to focus on boundaries of the measurement ball.

In step S104, the optical lens 21 scans the boundaries of the measurement ball, to obtain a first point-cloud of the boundaries of the measurement ball. The X, Y axis calibration module 108 fits a circle according to the first point-cloud, and determines X, Y coordinates of a center of the circle.

In step S106, the adjustment module 104 controls the spectral confocal sensor 22 to focus on the measurement ball and scan the measurement ball, to obtain two second point-clouds of the measurement ball. The X, Y axis calibration module 108 fits a ball according to the two second point-clouds, and determines X, Y coordinates of a center of the ball.

In step S108, the X, Y axis calibration module 108 calculates X, Y differences between the X, Y coordinates of the center of the circle and the X, Y coordinates of the center of the ball, and regards the calculated X, Y differences the first calibrated X difference and the first calibrated Y difference.

It is noted that FIG. 1 takes calibrating the first X, Y differences once as an example. By repeating steps 104-108, the first X, Y differences can be calibrated multiple times.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of an electronic device for calibrating a spectral confocal sensor of an image measurement machine, the method comprising steps of:
   (a) adjusting a zoom ratio of an optical lens of the image measurement machine to be a maximum zoom ratio of the optical lens;
   (b) calculating first X, Y, Z differences between X, Y, Z coordinates of a center of the optical lens and X, Y, Z coordinates of a center of the spectral confocal sensor;
   (c) obtaining first calibrated X, Y differences and second calibrated X, Y differences by calibrating the first X, Y differences at least twice using a measurement ball placed on a worktable of the image measurement machine;

(d) calculating second X, Y differences between the first calibrated X, Y differences and the second calibrated X, Y differences, determining if the second X, Y differences fall within first allowable ranges, and replacing the first X, Y differences by the second calibrated X, Y differences in response to determining that the second X, Y differences fall within the first allowable ranges;

(e) obtaining a first calibrated Z difference and a second calibrated Z difference by calibrating the first Z difference at least twice using a gauge block placed on the worktable of the image measurement machine; and (f) calculating a second Z difference between the first calibrated Z difference and the second calibrated Z difference, determining if the second Z difference falls within a second allowable range, and replacing the first Z difference by the second calibrated Z difference in response to determining that the second Z difference falls within the second allowable range.

2. The method as claimed in claim 1, wherein step (c) comprises:
(c1) adjusting the zoom ratio of the optical lens to be a minimum zoom ratio of the optical lens, and controlling the optical lens to focus on boundaries of the measurement ball;
(c2) obtaining a first point-cloud of the boundaries of the measurement ball by scanning the boundaries of the measurement ball using the optical lens;
(c3) fitting a circle according to the first point-cloud, and determining X, Y coordinates of a center of the circle;
(c4) obtaining two second point-clouds of the measurement ball by controlling the spectral confocal sensor to focus on the measurement ball and scan the measurement ball;
(c5) fitting a ball according to the two second point-clouds, and determining X, Y coordinates of a center of the ball;
(c6) calculating X, Y differences between the X, Y coordinates of the center of the circle and the X, Y coordinates of the center of the ball;
(c7) regarding the calculated X difference as the first calibrated X difference and the calculated Y difference as the first calibrated Y difference; and
(c8) repeating (c2)-(c6) to obtain the second calibrated X difference and the second calibrated Y difference.

3. The method as claimed in claim 1, wherein step (e) comprises:
(e1) adjusting the zoom ratio of the optical lens to be the maximum zoom ratio of the optical lens, and controlling the optical lens to focus on a defined point on the gauge block and measure a Z coordinate of the defined point by the optical lens;
(e2) controlling the spectral confocal sensor to focus on the defined point on the gauge block and measure a Z coordinate of the defined point by the spectral confocal sensor;
(e3) calculating a Z difference between the Z coordinate measured by the optical lens and the Z coordinate measured by the spectral confocal sensor;
(e4) regarding the calculated Z difference as the first calibrated Z difference; and
(e5) repeating (e2)-(e3) to obtain the second calibrated Z difference.

4. The method as claimed in claim 1, before step (a) further comprising:

setting a type of the spectral confocal sensor, and retrieving compensation data of the spectral confocal sensor from a controller electronically connected to the spectral confocal sensor according to the type; and
setting a sampling frequency and an illumination intensity of the spectral confocal sensor.

5. An electronic device for calibrating a spectral confocal sensor of an image measurement machine electronically connected to the electronic device, the electronic device comprising:
a processor;
a storage device having computer code stored thereon that, when executed by the processor, causes the processor to perform operations of:
(a) adjusting a zoom ratio of an optical lens of the image measurement machine to be a maximum zoom ratio of the optical lens;
(b) calculating first X, Y, Z differences between X, Y, Z coordinates of a center of the optical lens and X, Y, Z coordinates of a center of the spectral confocal sensor;
(c) obtaining first calibrated X, Y differences and second calibrated X, Y differences by calibrating the first X, Y differences at least twice using a measurement ball placed on a worktable of the image measurement machine;
(d) calculating second X, Y differences between the first calibrated X, Y differences and the second calibrated X, Y differences, determining if the second X, Y differences fall within first allowable ranges, and replacing the first X, Y differences by the second calibrated X, Y differences in response to determining that the second X, Y differences fall within the first allowable ranges;
(e) obtaining a first calibrated Z difference and a second calibrated Z difference by calibrating the first Z difference at least twice using a gauge block placed on the worktable of the image measurement machine; and
(f) calculating a second Z difference between the first calibrated Z difference and the second calibrated Z difference, determining if the second Z difference falls within a second allowable range, and replacing the first Z difference by the second calibrated Z difference in response to determining that the second Z difference falls within the second allowable range.

6. The electronic device as claimed in claim 5, wherein operation (c) comprises:
(c1) adjusting the zoom ratio of the optical lens to be a minimum zoom ratio of the optical lens, and controlling the optical lens to focus on boundaries of the measurement ball;
(c2) obtaining a first point-cloud of the boundaries of the measurement ball by scanning the boundaries of the measurement ball using the optical lens;
(c3) fitting a circle according to the first point-cloud, and determining X, Y coordinates of a center of the circle;
(c4) obtaining two second point-clouds of the measurement ball by controlling the spectral confocal sensor to focus on the measurement ball and scan the measurement ball;
(c5) fitting a ball according to the two second point-clouds, and determining X, Y coordinates of a center of the ball;
(c6) calculating X, Y differences between the X, Y coordinates of the center of the circle and the X, Y coordinates of the center of the ball;
(c7) regarding the calculated X difference as the first calibrated X difference and the calculated Y difference as the first calibrated Y difference; and (c8) repeating (c2)-(c6) to obtain the second calibrated X difference and the second calibrated Y difference.

7. The electronic device as claimed in claim 5, wherein operation (e) comprises:
(e1) adjusting the zoom ratio of the optical lens to be the maximum zoom ratio of the optical lens, and controlling the optical lens to focus on a defined point on the gauge block and measure a Z coordinate of the defined point by the optical lens;
(e2) controlling the spectral confocal sensor to focus on the defined point on the gauge block and measure a Z coordinate of the defined point by the spectral confocal sensor;
(e3) calculating a Z difference between the Z coordinate measured by the optical lens and the Z coordinate measured by the spectral confocal sensor;
(e4) regarding the calculated Z difference as the first calibrated Z difference; and
(e5) repeating (e2)-(e3) to obtain the second calibrated Z difference.

8. The electronic device as claimed in claim 5, before operation (a) further comprising:
setting a type of the spectral confocal sensor, and retrieving compensation data of the spectral confocal sensor from a controller electronically connected to the spectral confocal sensor according to the type; and
setting a sampling frequency and an illumination intensity of the spectral confocal sensor.

9. A non-transitory computer-readable medium having stored thereon instructions that, when executed by a processor of an electronic device, causing the processor to perform a method for calibrating a spectral confocal sensor of an image measurement machine, the method comprising steps of:
(a) adjusting a zoom ratio of an optical lens of the image measurement machine to be a maximum zoom ratio of the optical lens;
(b) calculating first X, Y, Z differences between X, Y, Z coordinates of a center of the optical lens and X, Y, Z coordinates of a center of the spectral confocal sensor;
(c) obtaining first calibrated X, Y differences and second calibrated X, Y differences by calibrating the first X, Y differences at least twice using a measurement ball placed on a worktable of the image measurement machine;
(d) calculating second X, Y differences between the first calibrated X, Y differences and the second calibrated X, Y differences, determining if the second X, Y differences fall within first allowable ranges, and replacing the first X, Y differences by the second calibrated X, Y differences in response to determining that the second X, Y differences fall within the first allowable ranges;
(e) obtaining a first calibrated Z difference and a second calibrated Z difference by calibrating the first Z difference at least twice using a gauge block placed on the worktable of the image measurement machine; and
(f) calculating a second Z difference between the first calibrated Z difference and the second calibrated Z difference, determining if the second Z difference falls within a second allowable range, and replacing the first Z difference by the second calibrated Z difference in response to determining that the second Z difference falls within the second allowable range.

10. The medium as claimed in claim 9, wherein step (c) comprises:
(c1) adjusting the zoom ratio of the optical lens to be a minimum zoom ratio of the optical lens, and controlling the optical lens to focus on boundaries of the measurement ball;
(c2) obtaining a first point-cloud of the boundaries of the measurement ball by scanning the boundaries of the measurement ball using the optical lens;
(c3) fitting a circle according to the first point-cloud, and determining X, Y coordinates of a center of the circle;
(c4) obtaining two second point-clouds of the measurement ball by controlling the spectral confocal sensor to focus on the measurement ball and scan the measurement ball;
(c5) fitting a ball according to the two second point-clouds, and determining X, Y coordinates of a center of the ball;
(c6) calculating X, Y differences between the X, Y coordinates of the center of the circle and the X, Y coordinates of the center of the ball;
(c7) regarding the calculated X difference as the first calibrated X difference and the calculated Y difference as the first calibrated Y difference; and
(c8) repeating (c2)-(c6) to obtain the second calibrated X difference and the second calibrated Y difference.

11. The medium as claimed in claim 9, wherein step (e) comprises:
(e1) adjusting the zoom ratio of the optical lens to be the maximum zoom ratio of the optical lens, and controlling the optical lens to focus on a defined point on the gauge block and measure a Z coordinate of the defined point by the optical lens;
(e2) controlling the spectral confocal sensor to focus on the defined point on the gauge block and measure a Z coordinate of the defined point by the spectral confocal sensor;
(e3) calculating a Z difference between the Z coordinate measured by the optical lens and the Z coordinate measured by the spectral confocal sensor;
(e4) regarding the calculated Z difference as the first calibrated Z difference; and
(e5) repeating (e2)-(e3) to obtain the second calibrated Z difference.

12. The medium as claimed in claim 9, before step (a) further comprising:
setting a type of the spectral confocal sensor, and retrieving compensation data of the spectral confocal sensor from a controller electronically connected to the spectral confocal sensor according to the type; and
setting a sampling frequency and an illumination intensity of the spectral confocal sensor.

* * * * *